(12) United States Patent
Lindenberger

(10) Patent No.: US 11,018,572 B2
(45) Date of Patent: May 25, 2021

(54) INVERTER WITH INTERMEDIATE CIRCUIT CAPACITOR CASCADE AND DC-SIDE COMMON-MODE AND DIFFERENTIAL-MODE FILTERS

(71) Applicant: VALEO SIEMENS EAUTOMOTIVE GERMANY GMBH, Erlangen (DE)

(72) Inventor: Heinz Lindenberger, Nuremberg (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 0 days.

(21) Appl. No.: 16/613,297

(22) PCT Filed: May 15, 2018

(86) PCT No.: PCT/EP2018/062602
§ 371 (c)(1),
(2) Date: Nov. 13, 2019

(87) PCT Pub. No.: WO2018/210869
PCT Pub. Date: Nov. 22, 2018

(65) Prior Publication Data
US 2020/0204058 A1   Jun. 25, 2020

(30) Foreign Application Priority Data
May 16, 2017   (DE) ............... 10 2017 110 608.1

(51) Int. Cl.
*H02M 1/14*   (2006.01)
*H02M 1/44*   (2007.01)
*H02M 7/5387*   (2007.01)

(52) U.S. Cl.
CPC ............... *H02M 1/14* (2013.01); *H02M 1/44* (2013.01); *H02M 7/53871* (2013.01)

(58) Field of Classification Search
CPC .................. H02M 1/14; H02M 1/44
See application file for complete search history.

(56) References Cited

U.S. PATENT DOCUMENTS 9,577,564 B2   2/2017   Schiffmann et al.
9,787,275 B2   10/2017   Sun
(Continued)

FOREIGN PATENT DOCUMENTS

DE         19607201 A1   8/1996
DE     102012002089 A1   8/2013
(Continued)

OTHER PUBLICATIONS

PCT/ISA/210, "International Search Report for International Application No. PCT/EP2018/062602," dated Sep. 24, 2018.
(Continued)

*Primary Examiner* — Thienvu V Tran
*Assistant Examiner* — Peter M Novak
(74) *Attorney, Agent, or Firm* — Manabu Kanesaka

(57) ABSTRACT

The invention relates to an inverter having an intermediate circuit capacitor, the connections of which are connected to supply lines for current supply and to a switching device which includes a plurality of half-bridges, wherein the intermediate circuit capacitor has a prespecified intermediate circuit capacitance, the magnitude of which is such that a ripple voltage which is formed in the supply lines by switching processes in the switching device is reduced to a prespecified maximum ripple voltage under prespecified operating conditions. For the purpose of reducing differential-mode interference, the invention proposes that a plurality of intermediate circuit capacitors which are connected in parallel are provided, wherein a sum of the capacitances of the plurality of intermediate circuit capacitors corresponds to the intermediate circuit capacitance.

8 Claims, 3 Drawing Sheets

(56) References Cited

U.S. PATENT DOCUMENTS

| | | | |
|---|---|---|---|
| 9,893,603 B2 | 2/2018 | Nishizawa et al. | |
| 2011/0094075 A1* | 4/2011 | Lee | H02M 1/44 |
| | | | 29/25.41 |
| 2014/0226376 A1 | 8/2014 | Hayashiguchi | |
| 2014/0321171 A1 | 10/2014 | Fujita et al. | |
| 2017/0256354 A1* | 9/2017 | Feng | H01F 27/34 |

FOREIGN PATENT DOCUMENTS

| | | |
|---|---|---|
| DE | 112015002084 T5 | 1/2017 |
| EP | 2099117 A2 | 9/2009 |
| EP | 2891576 A2 | 7/2015 |
| JP | H01-209951 A | 8/1989 |
| JP | 2000-209869 A | 7/2000 |
| JP | 2008-263729 A | 10/2008 |
| WO | 02/49196 A2 | 6/2002 |

OTHER PUBLICATIONS

A. Nonymous, "TOPSwitch Power Supply Design Techniques for EMI and Safety—Application Note AN-15," Power Integrations, Apr. 30, 2005, p. 1-36, Retrieved from the Internet: https://ac-dc.power.com/system/files_force/product-docs/an15.pdf [Retrieved on Sep. 12, 2018].

* cited by examiner

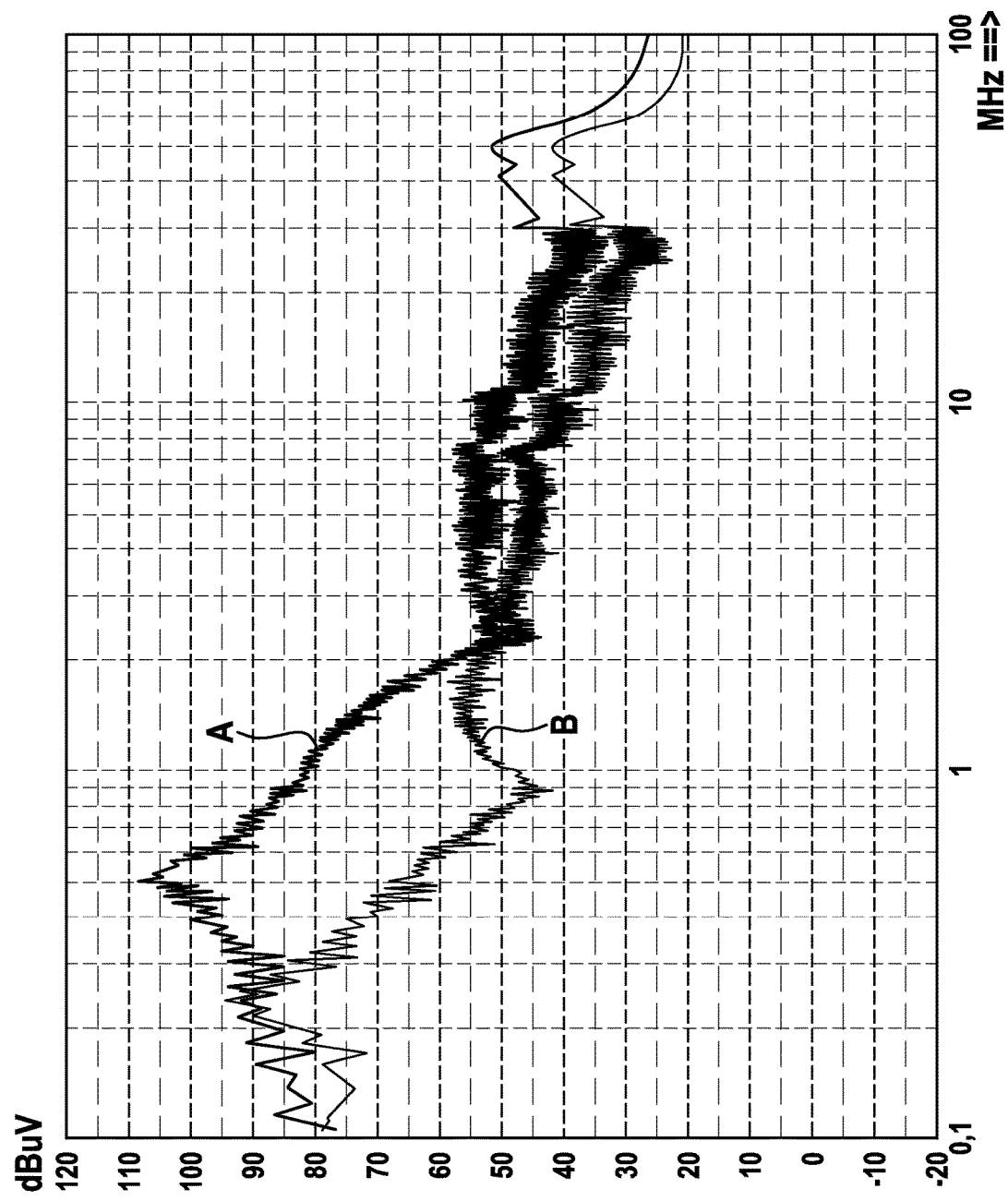

INVERTER WITH INTERMEDIATE CIRCUIT CAPACITOR CASCADE AND DC-SIDE COMMON-MODE AND DIFFERENTIAL-MODE FILTERS

RELATED APPLICATIONS

The present application is National Phase of International Application No. PCT/EP2018/062602 filed May 15, 2018, and claims priority from German Application No. 10 2017 110 608.1, filed May 16, 2017, the disclosure of which is hereby incorporated by reference herein in its entirety.

The invention relates to an inverter.

An inverter is known in general and is used, for example, for supplying power to a three-phase motor in electrically or partially electrically operated vehicles.

An inverter uses a plurality of half bridge circuits to convert direct current into alternating current. A controller drives the half-bridge circuits by means of pulse-width modulated signals to generate a specified AC voltage. A so-called intermediate circuit capacitor connects to the direct current supply lines for supplying current to the half-bridges.

Owing to the clocked driving of the half-bridges, common mode (CM) interference, which causes a ripple voltage, occurs in the supply line. In order to avoid an electromagnetic interference field which is formed by the ripple voltage, it is necessary to reduce the ripple voltage to a maximum prespecified value. An intermediate circuit capacitance of the intermediate circuit capacitor is selected in a suitable manner for this purpose. The correspondingly selected intermediate circuit capacitance is greater than a capacitance which is required for supplying power to the half-bridges.

Furthermore, differential-mode (DM) interference occurs during operation of the inverter. The DM interference is the result of changes in current in parasitic inductances of power transistors which are used in the half-bridges and also of the intermediate circuit capacitor. DM interference increases with the size of the phase current which is supplied to the electric motor by the half-bridges. To date, DM interference is sometimes not adequately filtered in the case of a high requested phase current.

The object of the invention is to eliminate the disadvantages of the prior art. The aim is, in particular, to specify an inverter with improved suppression of DM interference. According to a further objective of the invention, the aim is to be able to manufacture the inverter in as simple and cost-effective a manner as possible.

This object is achieved by an aspect of the invention. Expedient refinements of the invention can be found in the features of the dependent patent claims other aspects of the invention.

In accordance with the provisions of the invention, it is proposed that, for the purpose of reducing differential-mode or DM interference, a plurality of intermediate circuit capacitors which are connected in parallel are provided, wherein a sum of the capacitances of the plurality of intermediate circuit capacitors corresponds to the prespecified intermediate circuit capacitance. In other words, the intermediate circuit capacitor which is provided according to the prior art is replaced by a plurality of intermediate circuit capacitors which are connected in series. The prespecified intermediate circuit capacitance which was originally prespecified for the individual intermediate circuit capacitor is retained in the process. The ripple voltage remains substantially unchanged by the provision of a plurality of intermediate circuit capacitors.

Splitting the intermediate circuit capacitor into a plurality of intermediate circuit capacitors according to the invention advantageously considerably reduces DM interference, in particular when high phase currents are generated. Splitting the intermediate circuit capacitor into a plurality of intermediate circuit capacitors can be realized in a simple and cost-effective manner. Therefore, the said splitting is possible, in particular, because a requisite capacitance for driving the switching device is generally lower than a further requisite capacitance for reducing the ripple voltage to the prespecified maximum value. The sum of the capacitances of the split intermediate circuit capacitors is critical in respect of adjusting the prespecified maximum ripple voltage.

The prespecified maximum ripple voltage and therefore the selection of the magnitude of the intermediate circuit capacitance is based on customer requirements. In the case of a prespecified maximum ripple voltage, the magnitude of the intermediate circuit capacitance can be ascertained, for example, by simulation using a model which represents the inverter circuit in question. A model of this kind takes into account, in particular, the type of modulation, the cosine phi of the electric motor, the clock frequency of the power transistors in the half-bridges and also the intermediate circuit capacitance. In the simulation, the boundary conditions are set such that a maximum ripple voltage is produced. The intermediate circuit capacitance is then set such that a prespecified maximum ripple voltage is produced under boundary conditions of this kind. In the case of inverters for use in the automotive sector, a typical intermediate circuit capacitance lies in the range of 400 to 1000 µF.

A plurality of second intermediate circuit capacitors can also be connected upstream of the first intermediate circuit capacitor. In this case too, the sum of the first and of the second capacitances corresponds to the prespecified intermediate circuit capacitance. DM interference can be reduced more effectively by providing a plurality of second intermediate circuit capacitors.

Expediently, the first capacitance forms a share of 95 to 70% and the second capacitance forms a share of 5 to 30% of the prespecified intermediate circuit capacitance.

According to a further advantageous refinement of the invention, a first capacitance of a first intermediate circuit capacitor which is connected to the switching device is greater than a second capacitance of a second intermediate circuit capacitor which is connected upstream of the first intermediate circuit capacitor at the input end. The first capacitance of the first intermediate circuit capacitor is selected to be so high that the switching device can always be supplied with enough current thereby. The second capacitance is the result of the difference between the prespecified intermediate circuit capacitance and the first capacitance. An LC element which reduces DM interference is formed owing to the proposed provision of a first and a second intermediate circuit capacitor. In this case, the inductance L is formed by the connection lines between the first and the second intermediate circuit capacitor.

According to a further advantageous refinement of the invention, a filter circuit for reducing, in particular, CM interference is connected into the supply lines for supplying current to the intermediate circuit capacitors, wherein the filter circuit comprises one or more filter stages which are connected one behind the other. An X capacitor is advantageously connected between the supply lines in a filter stage. Furthermore, each supply line is connected to earth via a Y capacitor. The earth is formed by the housing or the housing potential of a housing of the inverter.

According to a further refinement, the filter stage comprises a toroidal-core inductor which surrounds the supply lines and also respectively comprises a filter inductor which engages around each of the supply lines. The toroidal-core inductor and the filter inductors can be combined in a component of suitable design.

Exemplary embodiments of the invention will be explained in more detail below with reference to the drawings, in which:

FIG. 3 shows the interference level in relation to frequency.

Figure 1:
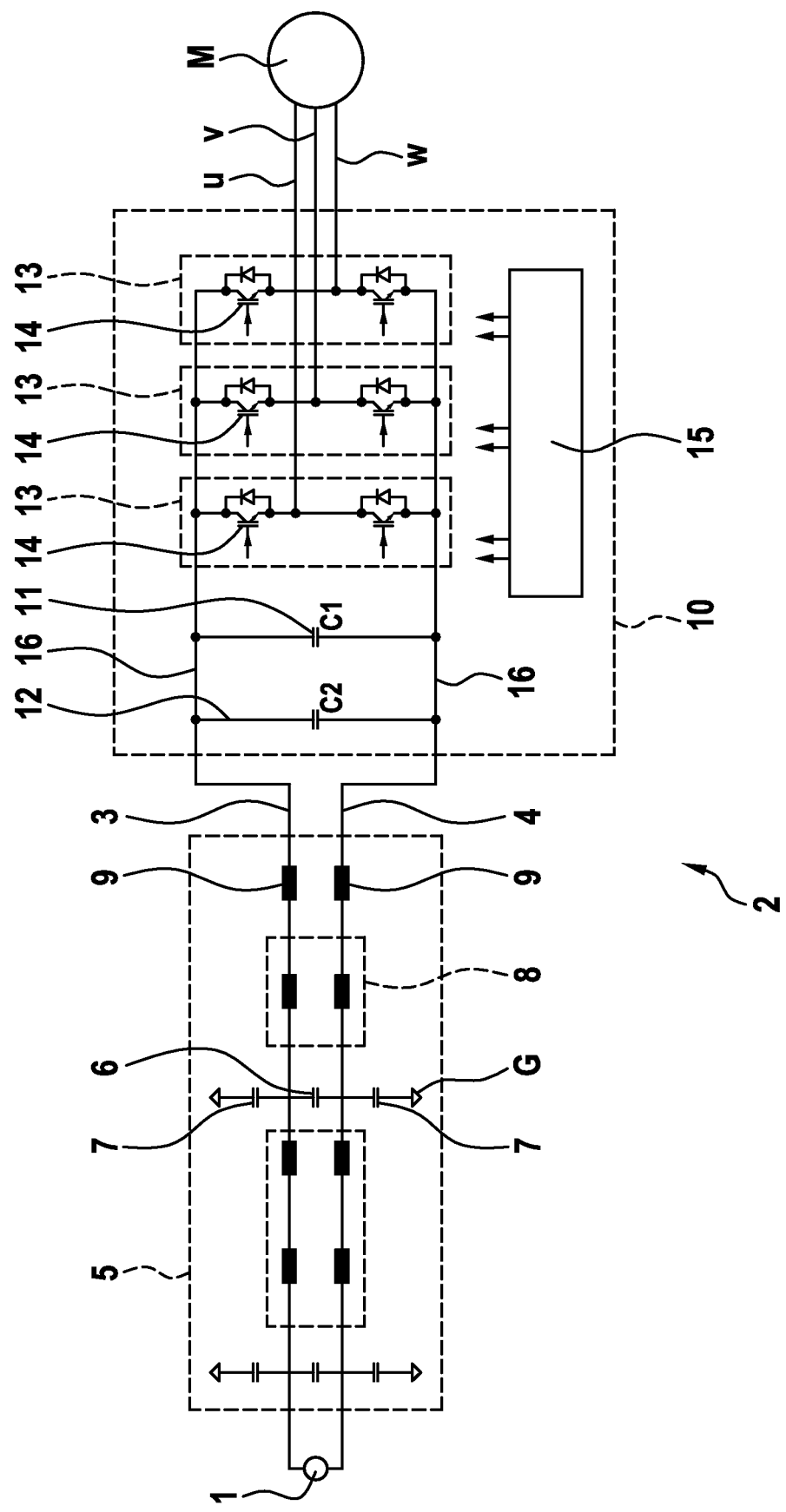
FIG. 1 shows a schematic first circuit arrangement of an inverter.
Figure 2:
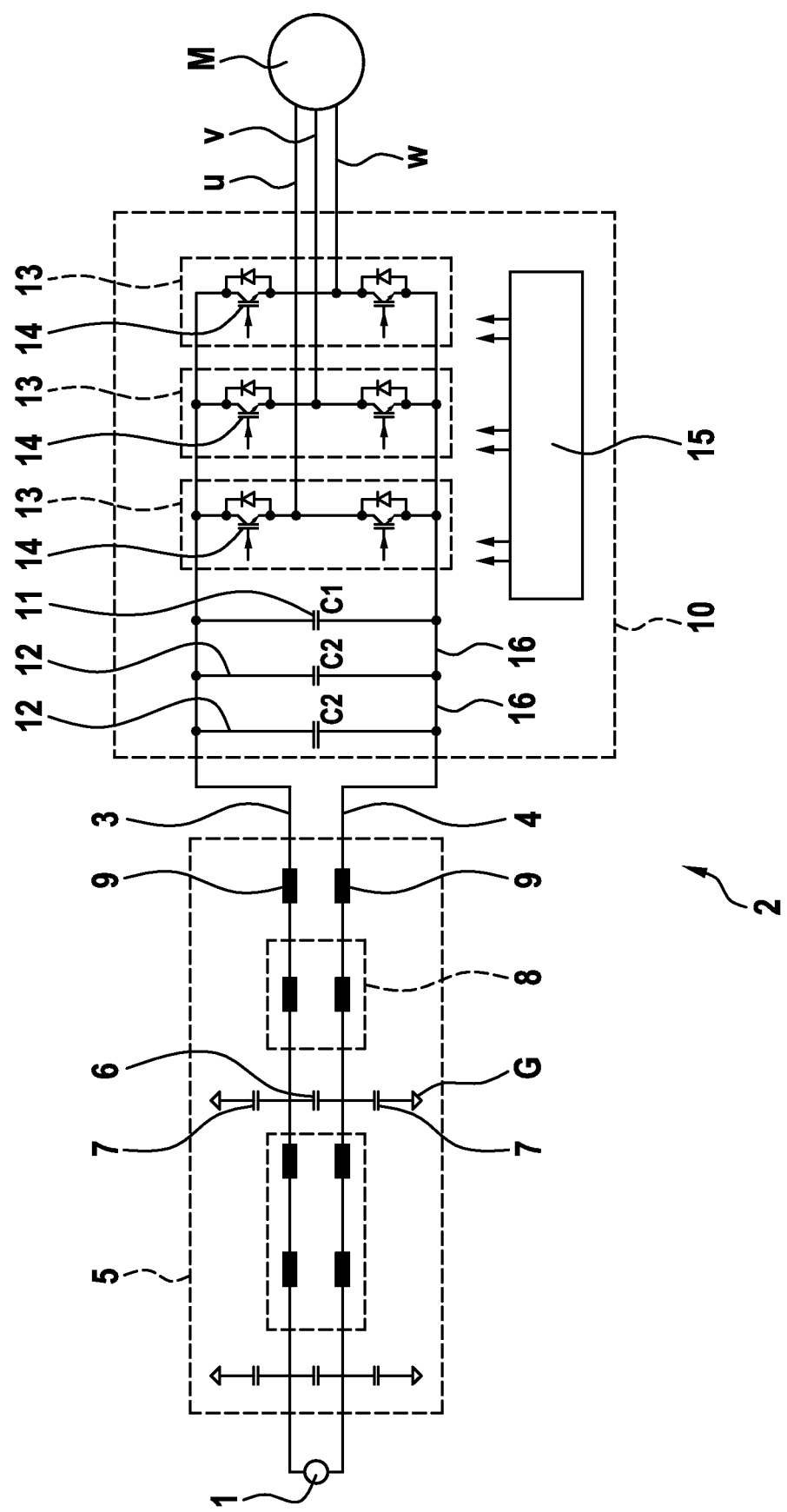
FIG. 2 shows a schematic circuit arrangement of a second inverter.

In FIGS. 1 and 2, reference sign 1 denotes a battery which supplies a voltage of, for example, 200 to 400 V. The battery 1 supplies power to an inverter which is denoted by reference sign 2 in general. A first supply line is denoted by reference sign 3 and a second supply line is denoted by reference sign 4. A filter circuit, which is denoted by reference sign 5 in general and which comprises two filter stages, is connected into the supply lines 3, 4. Each of the filter stages has an X capacitor 6, which is connected between the supply lines 3, 4, and also Y capacitors 7 which are connected between each of the supply lines 3, 4 and an earth G of a housing. A toroidal-core inductor which surrounds the supply lines 3, 4 is schematically denoted by reference sign 8. Reference sign 9 denotes filter inductors which surround each of the supply lines 3, 4. Here, the filter circuit 5 has two identical filter stages. Said filter circuit serves, in particular, to reduce CM interference.

An inverter element 10 is connected downstream of the filter circuit 5. The inverter element 10 comprises, at the input end, a first intermediate circuit capacitor 11 and also a second intermediate circuit capacitor 12 which is connected in parallel to said first intermediate circuit capacitor. Half-bridges 13, which each comprise two power transistors 14, are connected downstream of the first intermediate circuit capacitor 11. Said power transistors may be so-called IGBTs (insulated gate bipolar transistors). A controller, which is denoted by reference sign 15, is provided for driving the half-bridges 13. Pulse-width modulated signals are generated by the controller 15.

The phases u, v and w which are generated by the half-bridges 13 approximately form a sinusoidal alternating current for driving the three-phase motor M. If the three-phase motor M is operated as a generator, the three-phase current which is generated by the said generator is converted into direct current by the half-bridges 13 and stored in the battery 1.

In the present circuit arrangement, a first capacitance C1 of the first intermediate circuit capacitor 11 and a second capacitance C2 of the second intermediate circuit capacitor 12 are added up to form a prespecified intermediate circuit capacitance C.

The second intermediate circuit capacitor 12 which is connected in parallel upstream of the first intermediate circuit capacitor 11 forms an LC element. In this case, the inductance L is formed by the connection lines 16 which are provided between the first intermediate circuit capacitor 11 and the second intermediate circuit capacitor 12. The LC element reduces DM interference which occurs during operation of the inverter element 10.

In spite of splitting the intermediate circuit capacitor into a first intermediate circuit capacitor 11 and a second intermediate circuit capacitor 12 in line with the invention, the prespecified intermediate circuit capacitance C is maintained overall.

The intermediate circuit capacitance C is given by the sum of the first capacitance C1 and the second capacitance C2. In this case, the first capacitance C1 can form a share of 95 to 70% and the second capacitance C2 can form a share of 5 to 30% of the prespecified intermediate circuit capacitance C.

FIG. 2 shows a schematic circuit arrangement of a further inverter which differs from the circuit arrangement shown in FIG. 1 only in that two second intermediate circuit capacitors 12 are connected in parallel upstream of the first intermediate circuit capacitor 11. Two LC elements which provide even more effective reduction of DM interference are formed by the two second intermediate circuit capacitors 12. Here, the sum of the first capacitance C1 of the first intermediate circuit capacitor and the second capacitances C2 of the second intermediate circuit capacitors 12 once again also corresponds to the prespecified intermediate circuit capacitance C which results from a prespecified maximum ripple voltage under prespecified boundary or operating conditions.

In the present exemplary embodiment, the first capacitance C1 can lie in the range of 300 to 600 µF. Each of the second capacitances C2 can lie in the range of 30 to 150 µF.

FIG. 3 shows the interference level on the supply lines 3, 4 as a function of the frequency. Curve A in FIG. 3 shows the interference level in a conventional inverter in which only one single intermediate circuit capacitor is provided. An intermediate circuit capacitance C of the single intermediate circuit capacitor amounts to 500 µF. Curve B shows the interference level for an inverter in which a second intermediate circuit capacitor 12 is connected in parallel upstream of a first intermediate circuit capacitor 11. A first capacitance C1 of the first intermediate circuit capacitor 11 is 400 µF, a second capacitance C2 of the second intermediate circuit capacitor 12 is 100 µF. In this case—as in the case of curve A—an intermediate circuit capacitance of 500 µF is produced overall. Equally, it is clear from FIG. 3 that the voltage level which is represented by curve B is considerably lower than the interference level which is represented by curve A.

LIST OF REFERENCE SIGNS

1 Battery
2 Inverter
3 First supply line
4 Second supply line
5 Filter circuit
6 X capacitor
7 Y capacitor
8 Toroidal-core inductor
9 Filter inductor
10 Inverter element
11 First intermediate circuit capacitor
12 Second intermediate circuit capacitor
13 Half-bridge
14 Power transistor
15 Controller
16 Connection line
C Intermediate circuit capacitance
C1 First capacitance
C2 Second capacitance G Earth
M Three-phase motor
u, v, w Phase

The invention claimed is:

1. An inverter comprising:
   supply lines;
   a switching device including a plurality of half-bridges; and
   an intermediate circuit capacitor including a first intermediate circuit capacitor unit and a second intermediate circuit capacitor unit, each being connected to the supply lines for current supply and to the switching device,
   wherein the intermediate circuit capacitor has a prespecified intermediate circuit capacitance, a magnitude of which is such that a ripple voltage which is formed in the supply lines by switching processes in the switching device is reduced to a prespecified maximum ripple voltage under prespecified operating conditions,
   the first and second intermediate circuit capacitors which capacitor units are connected in parallel and are provided to reduce differential-mode interference, wherein a sum of first and second capacitances of the first and second intermediate circuit capacitor units corresponds to the prespecified intermediate circuit capacitance of the intermediate circuit capacitor, and
   the first capacitance of the first intermediate circuit capacitor unit connected to the switching device is greater than the second capacitance of the second intermediate circuit capacitor unit connected to an upstream of the first intermediate circuit capacitor unit at an input end.

2. The inverter according to claim 1, wherein the second intermediate circuit capacitor unit includes a plurality of third intermediate circuit capacitor units connected to the upstream of the first intermediate circuit capacitor unit at the input end.

3. The inverter according to claim 1, wherein the first capacitance forms a share of 95 to 70% and the second capacitance forms a share of 5 to 30% of the prespecified intermediate circuit capacitance.

4. The inverter according to claim 1, further comprising a filter circuit for reducing common-mode interference,
   wherein the filter circuit is connected into the supply lines, and includes at least one filter stage connected one behind the other.

5. The inverter according to claim 4, further comprising an X capacitor and a Y capacitor,
   wherein the X capacitor is connected between the supply lines in the at least one filter stage, and each of the supply lines is connected to earth via the Y capacitor.

6. The inverter according to claim 4, wherein the at least one filter stage comprises a toroidal-core inductor which surrounds the supply lines and a filter inductor which engages around each of the supply lines.

7. The inverter according to claim 4, further comprising an inverter element connected to a downstream of the filter circuit,
   wherein the inverter element includes the intermediate circuit capacitor at the input end, the switching device connected to a downstream of the intermediate circuit capacitor, and a controller for driving the switching device.

8. The inverter according to claim 7, wherein each of the plurality of half-bridges includes two power transistors, and
   the second intermediate circuit capacitor unit includes two of third intermediate capacitor units, and a sum of the first capacitance of the first intermediate circuit unit and third capacitances of the two third intermediate circuit capacitor units corresponds to the prespecified intermediate circuit capacitance of the intermediate circuit capacitor.

* * * * *